United States Patent [19]

Sugiura et al.

[11] Patent Number: 5,073,959

[45] Date of Patent: Dec. 17, 1991

[54] IMAGE PROCESSING APPARATUS WITH CONTOUR EXTRACTION

[75] Inventors: Takashi Sugiura; Mitsuru Kurita, both of Tokyo, Japan

[73] Assignee: Canon Kabushiki Kaisha, Tokyo, Japan

[21] Appl. No.: 590,586

[22] Filed: Sep. 28, 1990

Related U.S. Application Data

[63] Continuation of Ser. No. 344,500, Apr. 27, 1989, abandoned, which is a continuation of Ser. No. 110,784, Oct. 21, 1987, abandoned.

[30] Foreign Application Priority Data

Oct. 24, 1986 [JP] Japan .................................. 61-254400
Oct. 24, 1986 [JP] Japan .................................. 61-254402

[51] Int. Cl.$^5$ ............................................. G06K 9/48
[52] U.S. Cl. ........................................ 382/22; 382/50; 382/54
[58] Field of Search ................. 382/22, 50, 54, 47, 382/44; 340/730, 731, 728; 358/429, 430, 455, 456, 443

[56] References Cited

U.S. PATENT DOCUMENTS

| | | | |
|---|---|---|---|
| 4,554,593 | 11/1985 | Fox et al. | 382/54 |
| 4,589,034 | 5/1986 | Yokomizo | 358/234 |
| 4,610,026 | 9/1985 | Tabata et al. | 382/54 |
| 4,627,096 | 12/1986 | Grattoni et al. | 382/8 |
| 4,691,365 | 9/1987 | Nagashima | 382/54 |
| 4,691,366 | 9/1987 | Fenster et al. | 382/54 |
| 4,707,745 | 11/1987 | Sakano | 382/50 |
| 4,709,395 | 11/1987 | Fischer et al. | 382/54 |
| 4,748,677 | 5/1988 | Yokomizo | 382/50 |
| 4,769,849 | 9/1988 | Alsing | 382/54 |

Primary Examiner—Michael Razavi
Attorney, Agent, or Firm—Fitzpatrick, Cella, Harper & Scinto

[57] ABSTRACT

An image processing apparatus includes in one version an input device for inputting digital image data, a contour process circuit for emphasizing contour data in the digital image data form the input device, a circuit for smoothing the digital image data from the input device, and an output device for selectively outputting the digital image data input from the input device and subjected to different image processes in different designated areas. Densities of the contour and non-contour data can preferably be controlled independently of each other.

11 Claims, 7 Drawing Sheets

$$\alpha \times \begin{pmatrix} & & a & & \\ & & -1 & & \\ & b & c & d & \\ & -1 & 4 & -1 & \\ & & e & & \\ & & -1 & & \end{pmatrix} \begin{matrix} \rightarrow \text{PRECEDING} \\ \text{LINE} \\ \\ \rightarrow \text{LINE UNDER} \\ \text{CONSIDERATION} \\ \\ \rightarrow \text{SUCCEEDING} \\ \text{LINE} \end{matrix}$$

IMAGE PROCESSING APPARATUS WITH CONTOUR EXTRACTION

This application is a continuation of application Ser. No. 07/344,500, filed Apr. 27, 1989, now abandoned which was a continuation of application Ser. No. 07/110,784, filed Oct. 21, 1987, now abandoned.

BACKGROUND OF THE INVENTION

1. Field of the Invention

The present invention relates to an image processing apparatus.

2. Related Background Art

In a conventional image processing apparatus, a contour of input image data is emphasized or smoothed to generate a reproduction output signal for printing, or the like.

In this case, since the entire region of an input image is subjected to contour emphasis or to a smoothing process, if the input image includes a dot or line image, a print output locally having poor image quality is reproduced.

In another conventional apparatus, contour data of input image data is extracted and is reproduced.

In this case, if image portions having different characteristics are mixed in the input image data, the extracted contour becomes unclear due to a background image.

SUMMARY OF THE INVENTION

It is an object of the present invention to provide an image processing apparatus free from the conventional drawbacks.

It is another object of the present invention to provide an image processing apparatus which can appropriately reproduce an output even if data portions having different characteristics are mixed in input image data.

It is still another object of the present invention to provide an image processing apparatus which emphasizes or smoothes a contour of input image data in units of a predetermined area.

It is still another object of the present invention to provide an image processing apparatus which can extract contour data from input image data and can add density data.

It is still another object of the present invention to provide an image processing apparatus which can noticeably emphasize contour data extraced from input image data.

According to one apsect of the invention, these objects are attained by providing an image processing apparatus having first and second means for performing, respectively, contour emphasis processing and smoothing of input digital image data, and means for generating area data indicating various areas of an image represented by the input data. For each indicated area of the iamge, either contour-emphasis-processed data (from the first process means) or smoothed data (from the second process means) is selected, in accordance with the area data.

According to another aspect of the invention, these aspects are attained by providing an image processing apparatus in which contour data of input digital image data is extracted, and a density is set for image reproduction. The setting of the image density can be performed independently for the contour data and for data other than the contour data.

The above and other objects, features and advantages of the present invention will be apparent from the following description of the preferred embodiments of the present invention, taken in conjunction with the accompanying drawings.

DETAILED DESCRIPTION OF THE PREFERRED EMBODIMENTS

Figure 1:
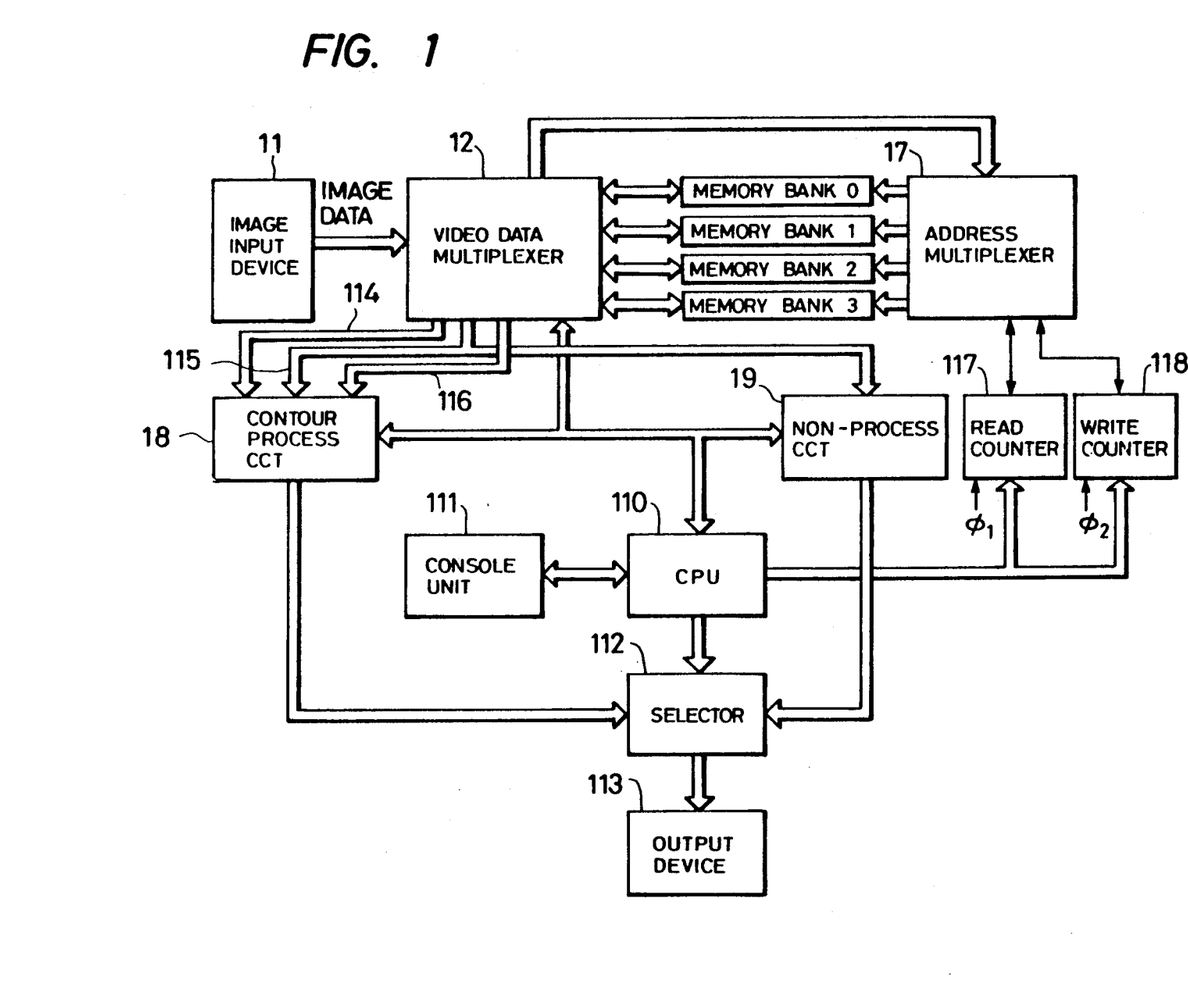
FIG. 1 is a block diagram showing one preferred embodiment of the present invention.

FIG. 1 is a block diagram showing an image processing apparatus according to an embodiment of the present invention.

In this embodiment, the image process apparatus comprises an image input device 11 for outputting 8-bit pixel data, a video data multiplexer 12 for determining a data destination, a memory bank 0, a memory bank 1, a memory bank 2, a memory bank 3, an address multiplexer 17 for determining a memory bank to be subjected to data storage and an address therein, a contour process circuit 18, a non-process circuit 19 which performs no contour processing, a CPU 110, a console unit 11, a selector 112, an output device 113, a communication line 114 through which data immediately preceding a line under consideration propagates, a communication line 115 through which data of a line under consideration propagates, and a communication line 116 through which data succeeding a line under consideration propagates. A read counter 117 determines an address for reading out data from the memory banks 0, 1, 2, and 3 by counting clocks $\phi_1$. A write counter 118 determines an address for writing data into the memory banks by counting clocks $\phi_2$.

Figure 2:
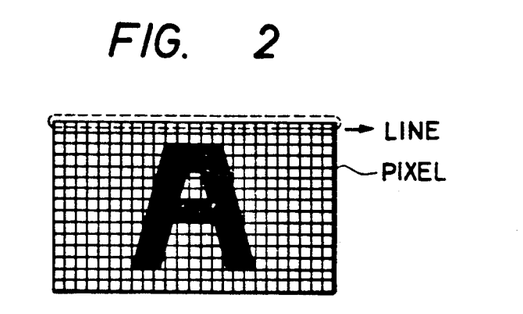
FIG. 2 is a view for explaining pixels and lines in the embodiment shown in FIG. 1.

The image input device 11 is a device for radiating a light beam onto an image formed on a document on a document table, dividing the image into pixels as a minimum unit of an image (FIG. 2), and reading the pixels using a light-receiving element such as a CCD.

Image data is sequentially written in the memory banks 0, 1, 2, and 3 by the video data multiplexer 12 and the address multiplexer 17 in units of data for a line. More specifically, 1-line data is first written in the memory banks 0, 1, and 2, and when write access of memory bank 3 is started, data stored in the memory banks 0, 1, and 2 are read out. Then, the read-out data are sent to the contour process circuit 18 through the communication lines 114, 115, and 116, and only the data of the line under consideration is sent to the non-processing circuit 19.

When write access of the memory bank 3 is completed and write access of the memory bank 0 is started, data stored in the memory banks 1, 2, and 3 are read out therefrom. The data read out from the memory bank 1 serves as data of a preceding line, the data read out from the memory bank 2 serves as data of a line under consideration, and data read out from the memory bank 3 serves as data of a succeeding line.

The above operations are performed for all the lines using the four memory banks.

Whether contour processing or non-processing is performed is determined in accordance with an input from the console unit 111. When the contour processing is performed, a density slice level and an output density after the contour processing are determined. In the case of non-processing, negative-positive conversion, and the like are determined, and a formation image is output from output device 13 (e.g., a printer).

An edge emphasis filter serves to detect a contour portion (a boundary between white and black portions in an image) of each pixel, binarization is performed using the arithmetic operation results and a threshold level, and a reproduction density is output in accordance with the binarization result. The contour process is performed in the order described above.

Figure 3:
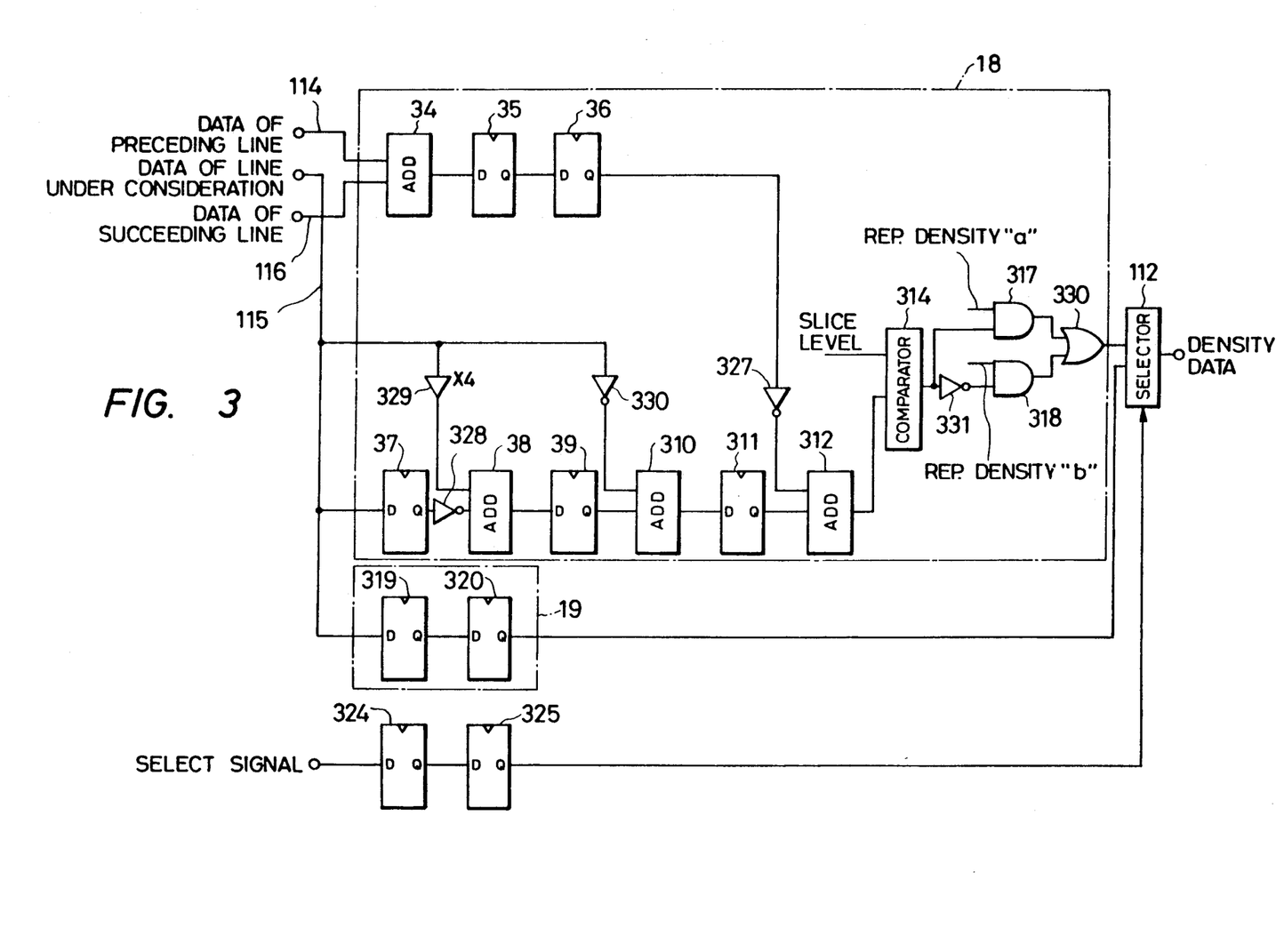
FIG. 3 is a circuit diagram showing in detail a contour process circuit and a non-process circuit in the embodiment shown in FIG. 1.
Figure 4:
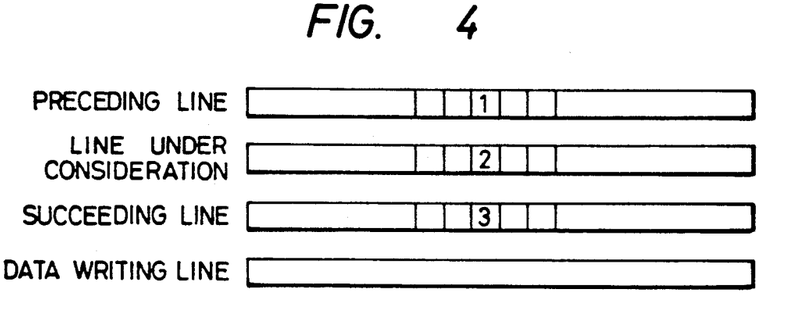
FIG. 4 is a view showing an image storage section of an image input device in the embodiment shown in FIG. 1.

FIG. 3 is a circuit diagram showing in detail the contour process circuit 18 and the non-processing circuit 19 in this embodiment, and FIG. 4 is a view showing an image storage section in the image input device of this embodiment.

In this embodiment, density data is input and output in units of 8 bits. However, during various processes, the unit of data processing may be temporarily increased up to 13 bits.

In FIG. 3, the non-processing circuit 19 has flip-flops 319 and 320. The contour process circuit 18 has adders 34, 38, 310, and 312, flip-flops 35, 36, 37, 39, and 311, a comparator 314, AND gates 317 and 318, an OR gate 330, inverters 328, 330, 327, and 331, and a multiplier 329. In addition, the circuit 18 has flip-flops 324 and 325 for delaying a select signal.

In FIG. 3, when 1-line data of image data (density data) from the image input device 11 is stored in a memory (one of the memory banks 0, 1, 2, and 3), data from the remaining memories for three lines are sent onto the communication lines 114, 115, and 116 in units of pixels. When all the input operations in the main scanning direction are completed for one memory, a line of the "oldest" (least recently writtin in) memory bank of the remaining three memory banks is set in the write mode, and data is output from the remaining three memory banks for three lines. In this manner, pixel data of a line under consideration is always sent onto the signal line 115, pixel data of a preceding line is sent onto the signal line 114, and pixel data of a succeeding line is sent onto the signal line 116.

In this embodiment, the operations of the contour processing and the non-processing can be switched in one main scanning line (in units of pixels).

Figure 5:
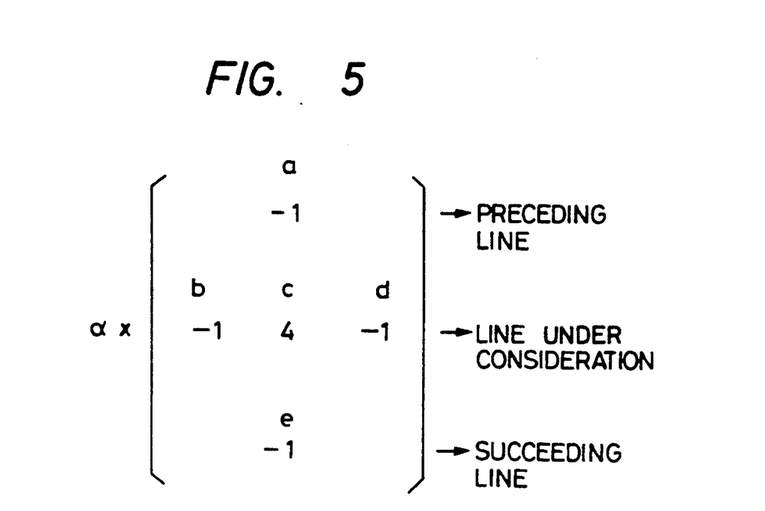
FIG. 5 is a view showing a matrix of an edge process filter in the embodiment shown in FIG. 1.

An edge emphasis filter shown in FIG. 5 is realized by the components 34 to 314.

More specifically, a and e shown in FIG. 5 are constituted by the adder 34, the flip-flops 35 and 36, and the inverter 327, b is constituted by the flip-flop 37 and the inverter 328, c is constituted by the multiplier 329, and d is constituted by the inverter 330.

An output signal from the adder 312 is compared with a slice level of the contour process by the comparator 14. If the output signal from the adder 312 exceeds the slice level, gate 317 is enabled, and a gate 318 is disabled. On the contrary, when the output signal from the adder 312 is below the slice level, the gate 318 is enabled, and the gate 317 is disabled.

In this case, as a reproduction density "a", a density corresponding to a contour output is set, and as a reproduction density "b", a non-output density is set. Thus, density data subjected to different density processes at a contour and a portion other than the contour is sent to the selector 112. In this manner, the selector 112 always receives density data of either the contour process or the non-processing. Meanwhile, the respective processes are selected in units of pixels in accordance with a selector signal input in a real time manner.

In this embodiment, the comparator 314 is an example of a binary means for binarizing contour data. A circuit constituted by the AND gates 317 and 318, the OR gate 330, and the inverter 331 is an example of an output density selection means for selecting one of a plurality of output densities. The console unit 111 shown in FIG. 1 is an example of a setting means for setting a threshold level for the binary means and the plurality of output densities "a" and "b". The slice level of the comparator 314 and the reproduction densities "a" and "b" can be freely set by the console unit 111.

Figure 6:
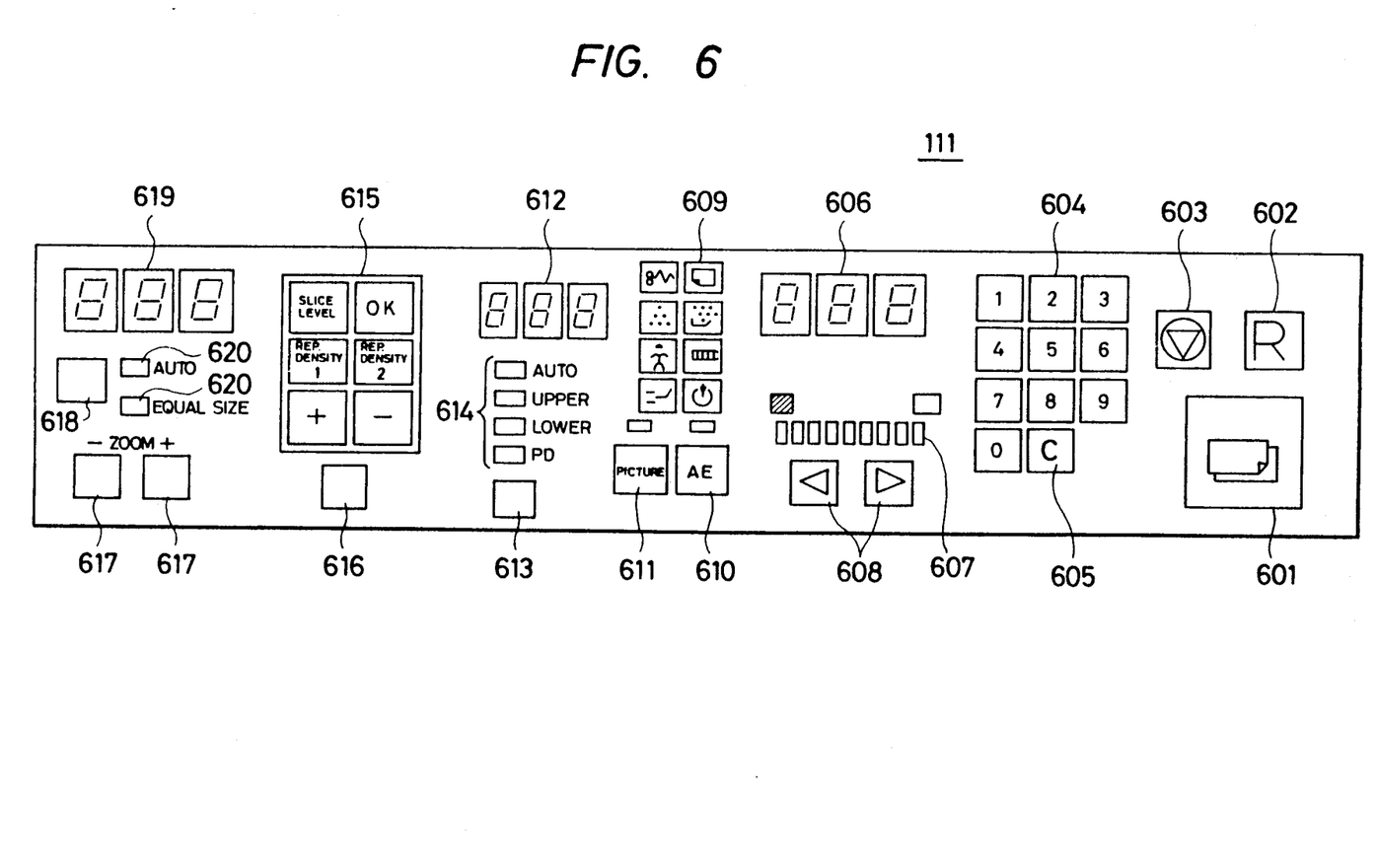
FIG. 6 is a view showing a console unit in the embodiment shown in FIG. 1.

FIG. 6 shows an example of the image input device in the above embodiment.

In FIG. 6, the image input device has a copy start key 601, a copy mode reset key 602 for returning all the copying modes to a standard mode, ten keys 604, a clear key 605, a copy number indicator 606, a copy density indicator 607, copy density adjusting keys 608, warning indicators 609, an AE key 610, a picture key 611 used for copying an image having gray scale levels such as a picture, an indicator 612 for indicating a slice level or an output density (1) or (2), a paper selection key 613, paper selection indicators 614, a display 615 for the slice level and the output densities (1) and (2), a contour/non-process setting key 616, magnification keys 617, an equal-size/auto.magnification key 618, a magnification indicator 619, and equal-size/auto-magnification indicators 620.

The operation of this embodiment will be described below.

Figure 7:
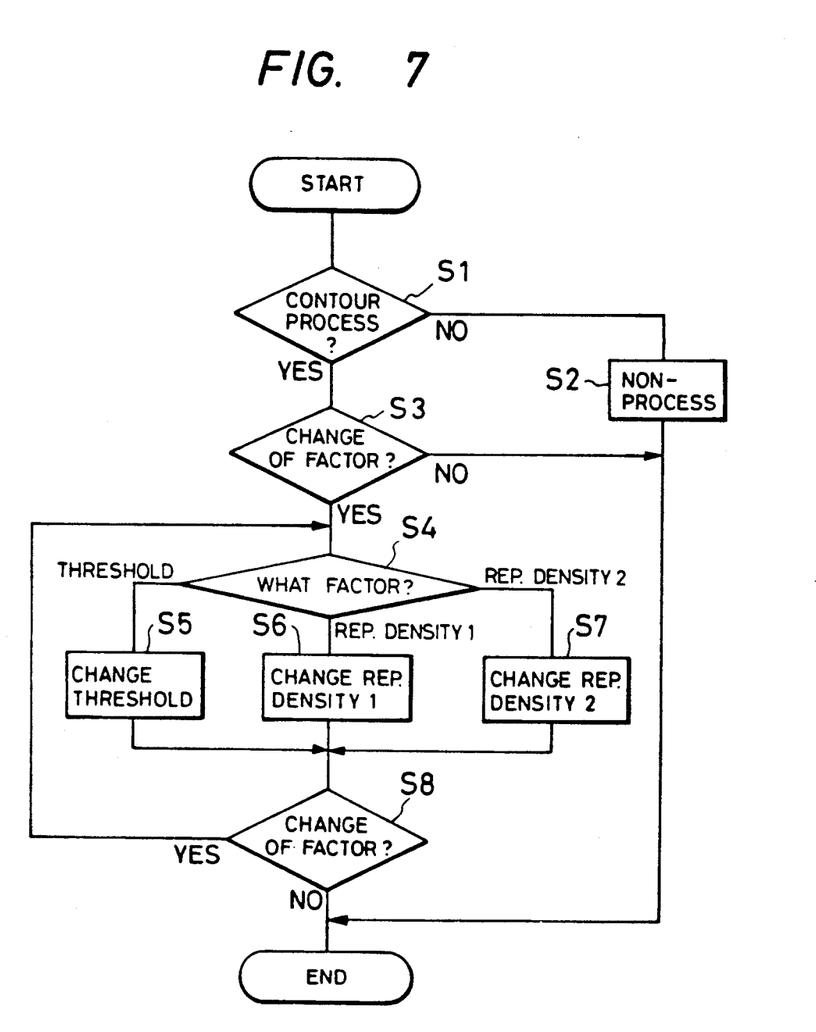
FIG. 7 is a flow chart for explaining an operation of the embodiment shown in FIG. 1.

FIG. 7 is a flow chart showing the operation of this embodiment.

When the contour process is to be performed, the contour/non-process setting key 616 is depressed to set a contour process mode (Sl), and the display 615 is set in the state shown in FIG. 6. In this case, if a non-process mode is to be resumed, the setting key 616 is depressed to turn off the display 615 (S2). When factors are to be changed (S3), a portion of the display 615 corresponding to any of the slice level and the reproduction densities (1) and (2) is depressed (S4, S5, S6, and S7). Thus, a default value is indicated in the indicator 612. If the default value is to be increased, a portion corresponding to "+" is depressed. If the default value is to be decreased, a portion corresponding to "−" is depressed. When the value has reached a value devised by the operator, a portion corresponding to "OK" is depressed. In this manner, the operator can arbitrarily set the slice level, and the reproduction densities (1) and (2).

Therefore, various contour processes can be performed. In various types of documents (e.g., picture, character, and the like), a contour image can be output in an optimal mode.

When a document is to be enlarged or reduced while performing the contour processing, the magnification key 617 can be depressed before or after the processing. In fact, after magnification processing is performed in the address multiplexer 17 under the address control, the contour processing is performed.

More specifically, when an image is to be reduced, the clocks $\phi_2$ of the write counter 118 are delayed with respect to image clocks, and sampled data is written in the memory bank. When an image is to be enlarged, the clocks $\phi_1$ of the read counter 117 are delayed with respect to the output clocks, and the same data is repeatedly output upon read access of the memory bank.

When an input mode is provided to the input device 11, the contour process can be performed in an AE mode, a picture mode, or a character mode. With these modes, the quality of an output image can be further improved in the contour process.

In a document including both pictures and characters, after areas of pictures and characters are designated, the respective areas are set in the picture mode and the character mode, thus obtaining an optimal contour image. Therefore, in an image input operation for various types of documents, e.g., a document of only characters and a document including both characters and pictures, the contour processing can be performed, and optimal output images can be obtained accordingly.

Since the contour process is performed after the enlargement or reduction process, the image quality is not degraded, and a variety of applications can be allowed in the field of design.

In the above embodiment, since the level extracted as contour data, and an output density of a contour portion (after processing) can be set by the operator, various patterns of output images (e.g., an image with bright or dark contour) can be obtained. Since the contour process is performed after the enlargement or reduction process, an output image having a uniform contour can be obtained independently of the enlargement or reduction process. If a picture is subjected to the contour process, a line drawing for coloring of, e.g., a man's face can be easily formed.

Figure 8:
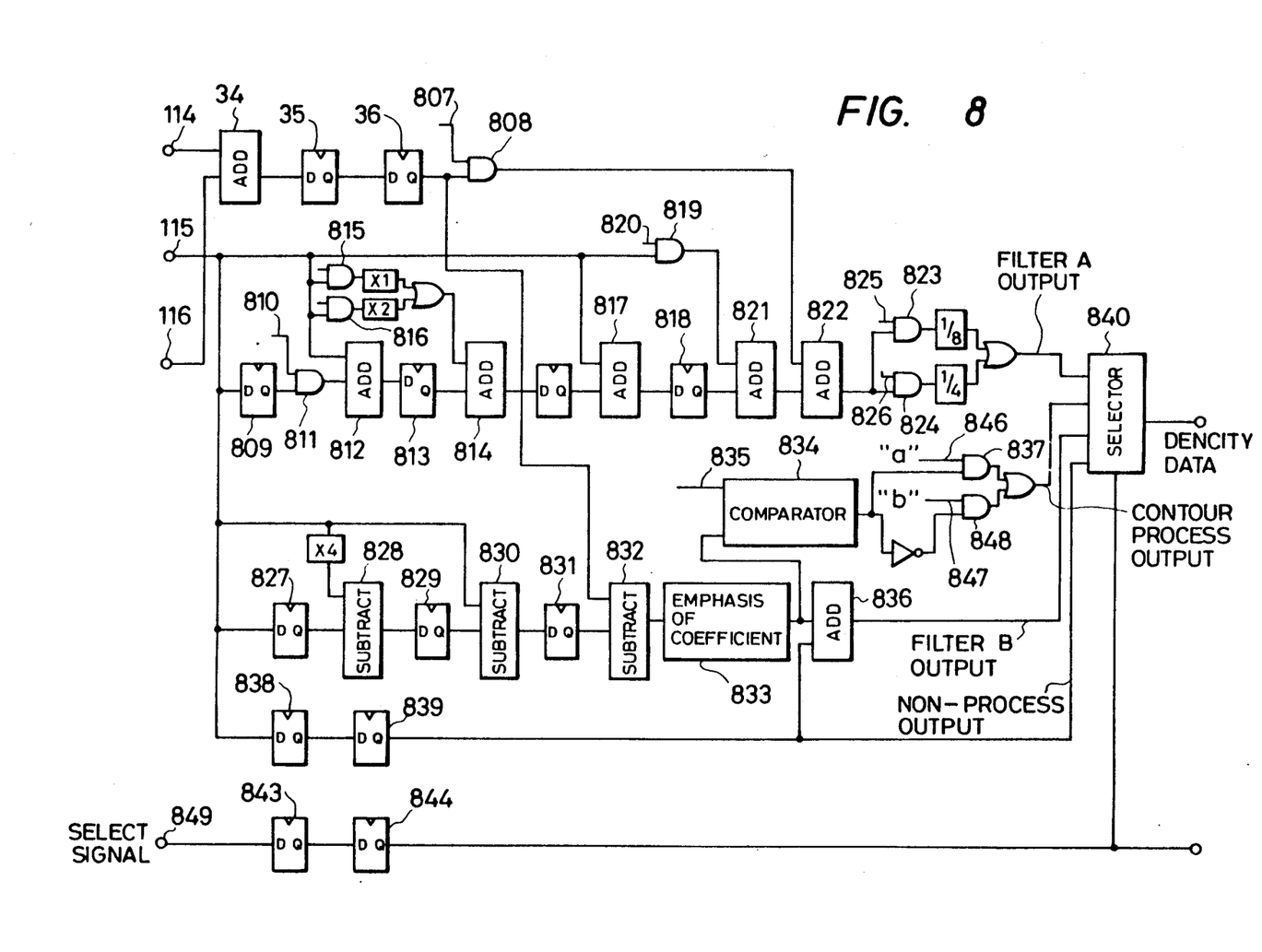
FIG. 8 is a circuit diagram showing another embodiment of the present invention.

FIG. 8 is a circuit diagram showing another embodiment of the present invention, and shows an image edit section in a digital copying machine. FIG. 8 includes a circuit having a function the same as that in FIG. 3.

In this embodiment, density data is processed in units of 8 bits, but the processing unit is temporarily increased up to about 13 bits during the process.

In FIG. 8, input devices 114, 115, and 116 are sections for inputting density data as in FIG. 3. The input device 115 receives pixel data of a line under consideration, the input device 114 receives pixel data of a preceding line, and the input device 116 receives pixel data of a succeeding line.

When all the pixel data for one line in the main scanning direction are input, a line of the oldest memory is set in a write mode, and data are output from the remaining three lines. A selector 840 selects one of a filter A output, a filter B output, a signal subjected to various contour processes, and a non-processed signal in accordance with a select signal. The selected signal is output as processed density data.

The operation of this embodiment will be described below.

Figure 10:
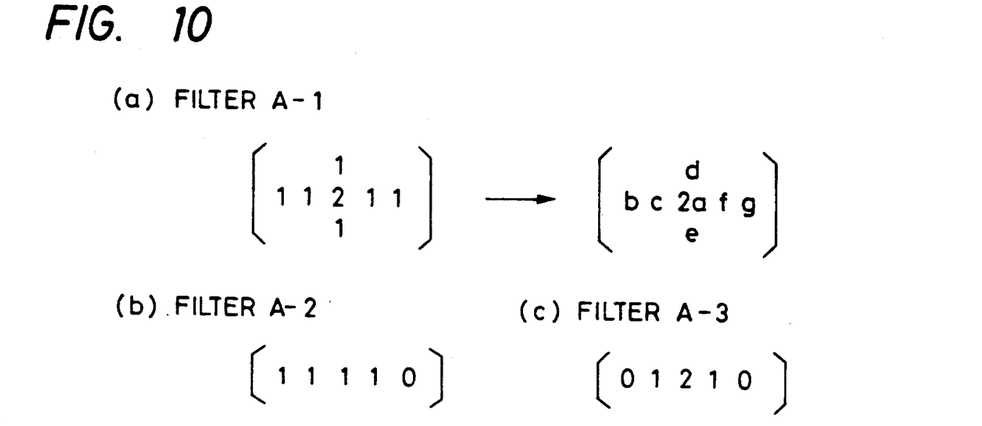
FIG. 10 is a view showing matrices of various filters in the embodiment shown in FIG. 8.

FIG. 10 is a view showing matrices of three types of filters, i.e., a filter A-1, a filter A-2, a filter A-3; that of a fourth, a filter B, is shown in FIG. 5.

The filter A-1 is realized by enabling gates 808, 811, 816, 819, and 823, and disabling gates 815 and 826.

More specifically, when the gate 816 is enabled and the gate 815 is disabled, pixel data under consideration on a line under consideration input from the input device 115 is doubled. When the gate 811 is enabled, an adder 812 calculates "b+c" shown in FIG. 10(a), and an adder 814 adds the doubled data "2a" to "b+c".

On the other hand, "f+g" is calculated when addition of an adder 817 is performed, a gate 819 is enabled, and addition of adder 821 is performed. Pixel data of preceding and succeeding lines are added by an adder 804, and a gate 808 is enabled to calculate "d+e". In this manner, an adder 822 outputs a calculation result of (2a+b+c+d+e+f+g).

When a gate 823 is enabled and a gate 824 is disabled, the calculation result from the adder 822 is multiplied by $\frac{1}{8}$, and then, $\frac{1}{8}$(2a+b+c+d+e+f+g) is input to the selector 840. In this manner, the filter A-1 is realized.

The filters A-2 and A-3 are realized in the same manner as described above.

More specifically, the filter A-2 is realized when the gates 811, 815, and 824 are enabled and gates 808, 816, 819, and 823 are disabled. The filter A-3 is realized when the gates 816 and 824 are enabled and the gates 808, 811, 815, 819, and 823 are disabled.

The filter B will be explained below.

The filter B (FIG. 5) is realized by subtractors 828, 830, and 832, and an emphasis coefficient circuit 833. The emphasis coefficient circuit 833 determines one value in the range $\frac{1}{8}$ to 15/8 as an emphasis coefficient $\alpha$. Pixel data of a pixel under consideration and data multiplied by the emphasis coefficient $\alpha$ are added by an adder 836. The sum is density data realizing the filter B process. Thus, the contour-emphasized density data is supplied to the selector 840.

The contour extraction process will be described below.

In the contour extraction process, an output from the emphasis coefficient circuit 833 (data multiplied with the emphasis coefficient $\alpha$) is compared by a comparator 835 with a value preset at a terminal 835 as a slice level of the contour process. If the output from the emphasis coefficient circuit 833 exceeds the slice level, for example, a gate 837 is enabled and a gate 848 is disabled. When the output from the emphasis coefficient circuit 833 is below the slice level, the gate 848 is enabled and the gate 837 is disabled. In this case, if a density corresponding to a contour output is set at at erminal 846, and a non-output density is set at a temrinal 846, and a non-output density is set at a terminal 847, density data subjected to the contour process can be sent to the selector 840.

Non-processed pixel data is sent to the selector 840 through flip-flops 838 and 839.

In this manner, the selector 840 always receives density data corresponding to a filter A output, a filter B output, a contour process output, a non-processed output, and can select the respective process outputs in units of pixels in accordance with the select signal in a real time manner.

Figure 9:
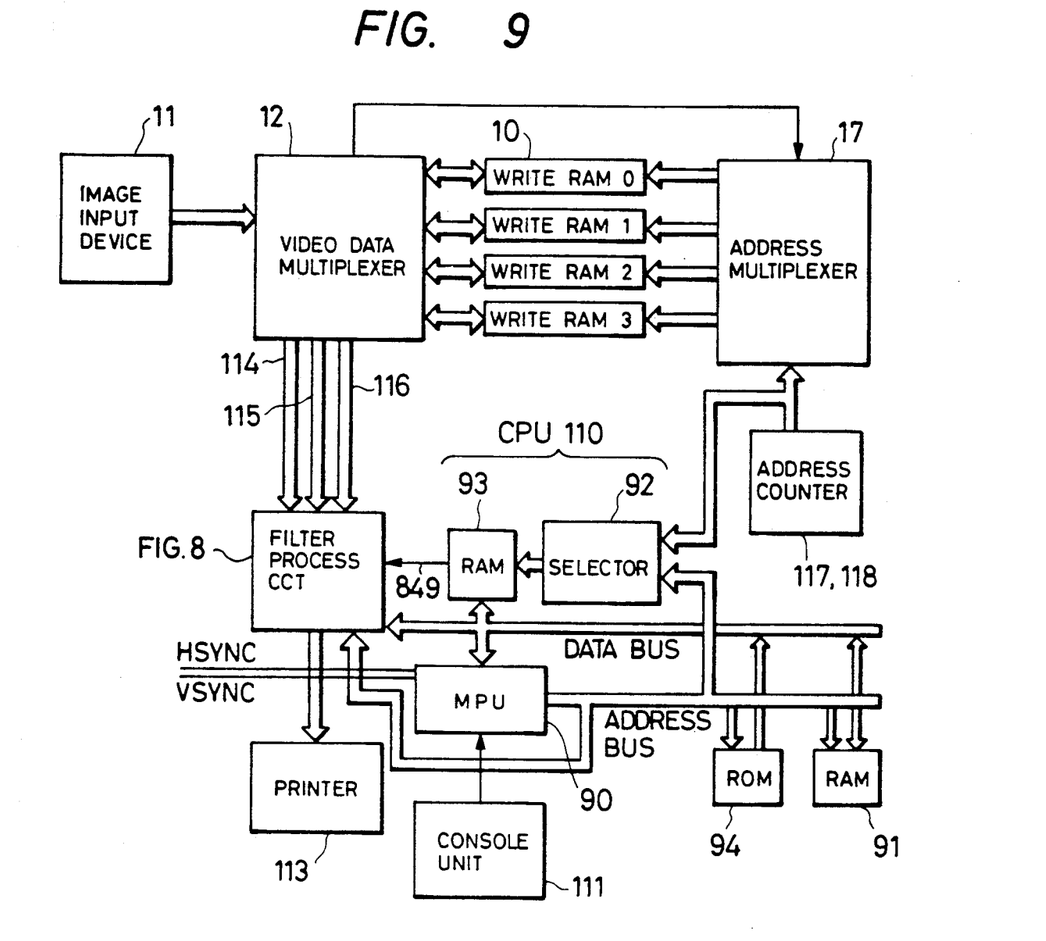
FIG. 9 is a block diagram of an edit circuit.

Note that a control signal for each gate, a slice level of the comparator, density data at the terminals 846 and 847, the emphasis coefficient α of the filter B, and a select signal 849 can be freely selected by a CPU (110 in FIG. 1) shown in FIG. 9.

FIG. 9 shows an edit process circuit realized by a CPU. When area data (coordinates X and Y) are input by the ten keys 504 of the console unit 111 and a mode is input by the mode key 616, these data are stored in a data RAM 91 through a microprocessor (MPU) 90 in the CPU. A RAM 93 serves as a control memory, and has a bit capacity corresponding to one main scanning line where one pixel corresponds to 2 bits. Therefore, 2-bit pixel data in the control memory 93 corresponds to a select signal 849 per pxiel. If the 2-bit data is "11", an output processed by the filter A is selected for a corresponding pixel; if "10", a contour processed output; if "01", an output processed by the filter B; and if "00", a non-processed output. Control data for the control memory 93 is determined by area data and process mode data in the data RAM 91. More specifically, an address for writing control data for one line in the control memory 93 is determined by counting pixel clocks by the MPU with reference to a main scanning sync signal HSYNC. If control data between first and second addresses determined by the area data in the control memory 93 are all set to be "11" and other control data are set to be "00", data between the first and second addresses are smoothed and output, and other data are output without being processed. In a subscanning direction, control data in the control memory 93 is rewritten at a timing corresponding to an area for which image process is to be changed. In this process, when the MPU 90 begins to count HSYNC pulses from a VSYNC pulse, and a count determined by area data has been reached, all the control data for one line in the control memory 93 are set to be "00". With this process, non-processed image data are thus output. The VSYNC pulse is a reference signal for starting a page, and resets the HSYNC count operation by he MPU. The HSYNC pulse is a reference signal for starting a line, and resets pixel counting by the MPU. Whend ata is read out from the control memory 93, the data is read out by the address counter 118 through the selector 92 to be synchronized with the memory banks.

Since the control memory can store four types of control data, four ways of area image processes can be performed in both the main scanning direction and the subscanning direction.

If a signal synchronous with an image detection signal of a document from an image scanner for generating image data is used as the VSYNC signal, and a signal synchronous with a horizontal sync beam position detection signal of a laser beam printer for reproducing and printing an iamge is used as the HSYNC signal, real-time image process in units of areas can be performed.

In the above embodiment, in addition to matrix shapes corresponding to the filters A and B, various shapes of matrices can be set by simple modification of the hardware. In addition, processes other than the above-mentioned processes may be employed. As shown in FIG. 9, when an arbitrary portion is designated from the console unit, and the CPU (MPU) switches the processes in units of pixels, the processes can be switched at the arbitrary portion.

The switching operation of processes, the slice level, and the setting operation of densities can be selected by the operator. If density data of an image is sampled in advance, the respective processes can be automatically switched.

In the above embodiment, the digital copying machine has been exemplified. However, the present invention can be applied to other image edit apparatuses.

We claim:

1. An image processing apparatus comprising:
   input means for inputting digital image data representing an image;
   first process means for performing a contour extracting process on the digital image data from said input means and forming contour data representing a contour of the image;
   second process means for performing a contour emphasis process on the digital image data from said input means by using the contour data formed by said first process means, and forming contour-emphasis processed data; and
   selecting means for selecting one of the contour data formed by said first process means and the contour-emphasis processed data formed by said second process means and outputting the selected data.

2. An apparatus according to calim 1, wherein said input means comprises reading means for reading an image of a document and generating the digital image data.

3. An image processing apparatus comprising:
   input means for inputting digital image data representing an image;
   process emans for performing a contour extracting process on the digital image data from said input means and forming first data representing a contour of the image and second data representing a non-contour portion;
   setting means for setting a first density of the contour of the image and a second density of the non-contour portion; and
   generating means for generating digital image data having the first density set by said setting means corresponding to the first data formed by said process means, and generating digital image data having the second density set by said setting means corresponding to the second data formed by said process means.

4. An apparatus according to claim 3, wherein said setting means sets the density of the contour and the density of the non-contour portion regardless of a density of the digital image data from said input means.

5. An apparatus according to claim 3, further comprising second process means for performing an enlargement or reduction process on the digital image data prior to the contour extracting process.

6. An apparatus according to claim 3, wherein said input means comprises reading means for reading an image of a document and generating the digital image data.

7. An apparatus according to claim 3, further comprising reproduction means for reproducing an image in accordance with the digital image data generated by said generating means.

8. An apparatus according to claim 1, wherein a parameter for the contour extracting process carried out by said first process means is variable.

9. An apparatus according to claim 1, wherein a parameter for the contour emphasis process carried out by said second process means is variable.

10. An apparatus according to claim 1, wherein said first process emans and said second process means work in parallel.

11. An apparatus according to claim 1, further comprising reproduction means for reproducing an image in accordance with digital image data selected by said selecting means.

* * * * *

UNITED STATES PATENT AND TRADEMARK OFFICE
CERTIFICATE OF CORRECTION

PATENT NO. : 5,073,959
DATED : December 17, 1991
INVENTOR(S) : TAKASHI SUGIURA, ET AL.          Page 1 of 3

It is certified that error appears in the above-identified patent and that said Letters Patent is hereby corrected as shown below:

IN [57] ABSTRACT

Line 4, "form" should read --from--.

SHEET 6 OR 7

FIG. 8, "DENCITY" should read --DENSITY--.

COLUMN 1

Line 49, "extraced" should read --extracted--.
   Line 51, "apsect" should read --aspect--.
   Line 63, "aspects" should read --objects--.

COLUMN 2

Line 44, "11," should read --111,--.

COLUMN 3

Line 20, "output device 13" should read --output device 113--.
   Line 40, "OR gate" should read --OR gate--.

COLUMN 4

Line 3, "14." should read --314.--.
   Line 16, "selected" should read --selected,-- and "pixels" should read --pixels,--.
   Line 17, "real time" should read --real-time--.
   Line 64, "devised" should read --desired--.

UNITED STATES PATENT AND TRADEMARK OFFICE
CERTIFICATE OF CORRECTION

PATENT NO. : 5,073,959
DATED : December 17, 1991
INVENTOR(S) : TAKASHI SUGIURA, ET AL.

It is certified that error appears in the above-identified patent and that said Letters Patent is hereby corrected as shown below:

COLUMN 6

Line 36, "value" should read --value,-- and
"15/8" should read --15/8, inclusive,--.
Line 47, "tor 835" should read --tor 834--.
Line 54, "at at" should read --at a--.
Line 55, "erminal 846," should read --terminal 846,-- and
"temrinal" should read --terminal 847,--.
Line 56, delete line 56.
Line 66, "real time" should read --real-time--.

COLUMN 7

Line 6, "ten keys 504" should read --ten keys 604--.
Line 12, "pxiel." should read --pixel.--.
Line 39, "Whend ata" should read --When data--.
Line 52, "iamge" should read --image--.

UNITED STATES PATENT AND TRADEMARK OFFICE
CERTIFICATE OF CORRECTION

PATENT NO.  : 5,073,959

DATED       : December 17, 1991

INVENTOR(S) : TAKASHI SUGIURA, ET AL.

It is certified that error appears in the above-identified patent and that said Letters Patent is hereby corrected as shown below:

COLUMN 8

Line 26, "process emans" should read --process means--.
   Line 62, "first process emans" should read
        --first process means--.

In addition the certificate of correction to issue will show col. 7, line 37, "he" should read --the--.

Signed and Sealed this

Eighth Day of June, 1993

Attest:

MICHAEL K. KIRK

*Attesting Officer*    *Acting Commissioner of Patents and Trademarks*